(12) United States Patent
Virolainen et al.

(10) Patent No.: US 9,621,991 B2
(45) Date of Patent: Apr. 11, 2017

(54) SPATIAL AUDIO APPARATUS

(71) Applicant: Nokia Technologies Oy, Espoo (FI)

(72) Inventors: Jussi Kalevi Virolainen, Espoo (FI);
Kari Juhani Järvinen, Tampere (FI);
Marko Tapani Yliaho, Tampere (FI);
Antti Heikki Tapio Sassi, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/650,992

(22) PCT Filed: Dec. 18, 2012

(86) PCT No.: PCT/IB2012/057430
§ 371 (c)(1),
(2) Date: Jun. 10, 2015

(87) PCT Pub. No.: WO2014/096900
PCT Pub. Date: Jun. 26, 2014

(65) Prior Publication Data
US 2015/0319530 A1    Nov. 5, 2015

(51) Int. Cl.
*H04R 5/02* (2006.01)
*H04R 5/04* (2006.01)
(Continued)

(52) U.S. Cl.
CPC ............ *H04R 5/02* (2013.01); *H04N 7/15* (2013.01); *H04R 5/04* (2013.01); *H04S 3/006* (2013.01);
(Continued)

(58) Field of Classification Search
CPC .. H04R 5/02; H04R 5/04; H04R 3/005; G06F 21/32; G10L 17/22
(Continued)

(56) References Cited

U.S. PATENT DOCUMENTS

| | | | |
|---|---|---|---|
| 7,903,137 B2 * | 3/2011 | Oxford | H04N 7/142 348/14.01 |
| 2009/0136044 A1 | 5/2009 | Xiang et al. | |

(Continued)

FOREIGN PATENT DOCUMENTS

| | | |
|---|---|---|
| EP | 1551205 A1 | 7/2005 |
| WO | 2012063103 A1 | 5/2012 |

(Continued)

OTHER PUBLICATIONS

International Search Report and Written Opinion received for corresponding Patent Cooperation Treaty Application No. PCT/IB2012/057430, dated Oct. 11, 2013, 12 pages.

*Primary Examiner* — Thjuan K Addy
(74) *Attorney, Agent, or Firm* — Harrington & Smith

(57) ABSTRACT

An apparatus comprising: an input configured to receive at least one audio signal from a further apparatus; an input configured to receive at least one audio signal associated with the apparatus; an orientation/location determiner configured to determine a relative orientation/location difference between the apparatus and the further apparatus; an audio processor configured to process the at least one audio signal from the further apparatus based on the relative orientation/location difference between the apparatus and the further apparatus; and a combiner configured to combine the at least one audio signal from the further apparatus having been processed and the at least one audio signal associated with the apparatus.

21 Claims, 12 Drawing Sheets

(51) Int. Cl.
*H04N 7/15*   (2006.01)
*H04S 3/00*   (2006.01)
G10L 19/008   (2013.01)
H04S 7/00   (2006.01)

(52) U.S. Cl.
CPC ............... *G10L 19/008* (2013.01); *H04S 7/40* (2013.01); *H04S 2400/15* (2013.01)

(58) Field of Classification Search
USPC .................................... 381/303, 306, 304, 1
See application file for complete search history.

(56) References Cited

U.S. PATENT DOCUMENTS

| | | | |
|---|---|---|---|
| 2009/0264114 A1* | 10/2009 | Virolainen | H04M 3/56 455/416 |
| 2011/0081024 A1 | 4/2011 | Souldore et al. | |
| 2011/0301730 A1 | 12/2011 | Kemp et al. | |

FOREIGN PATENT DOCUMENTS

| WO | WO-2012/063103 A1 | 5/2012 |
|---|---|---|
| WO | WO-2012/164153 A1 | 12/2012 |

* cited by examiner

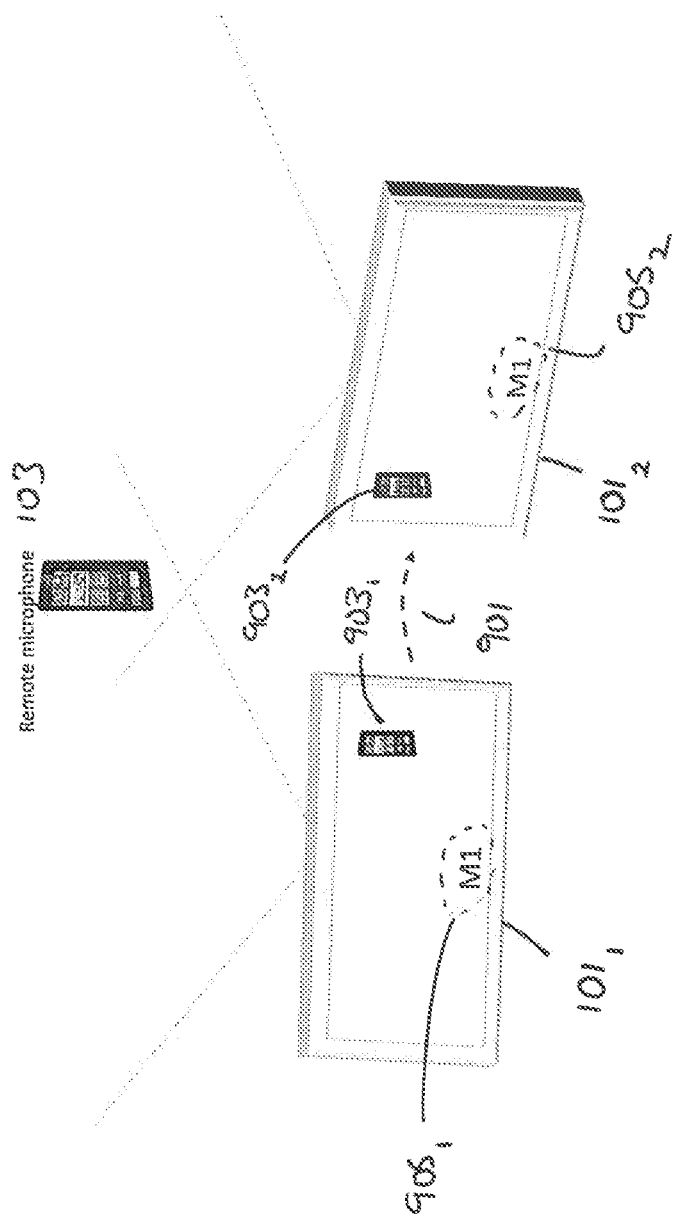

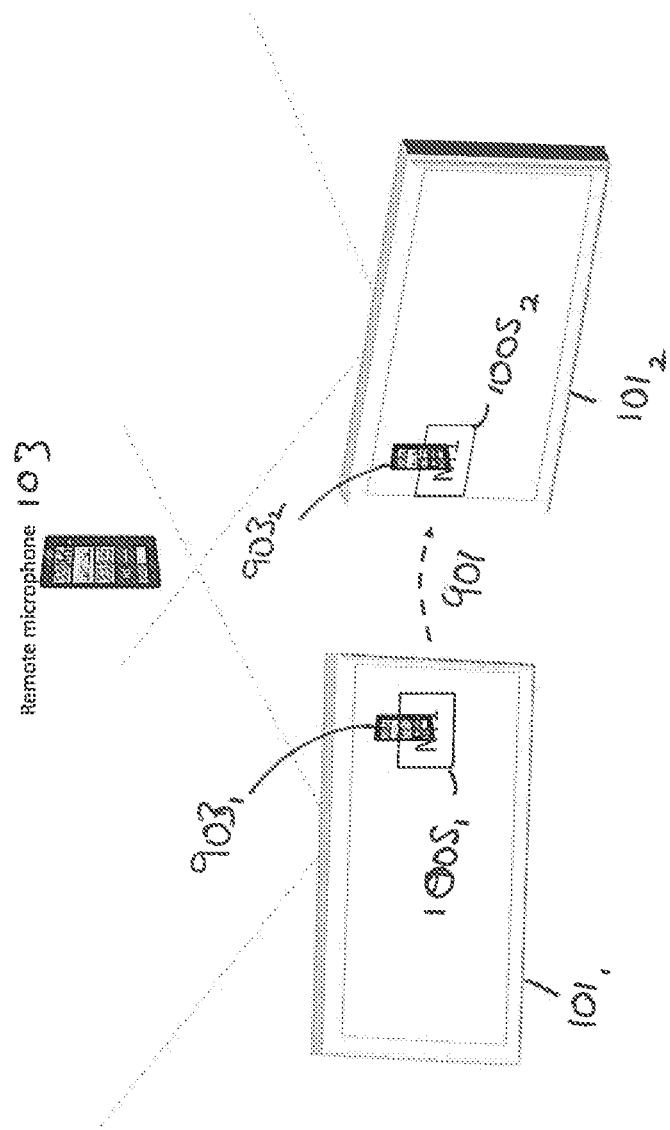

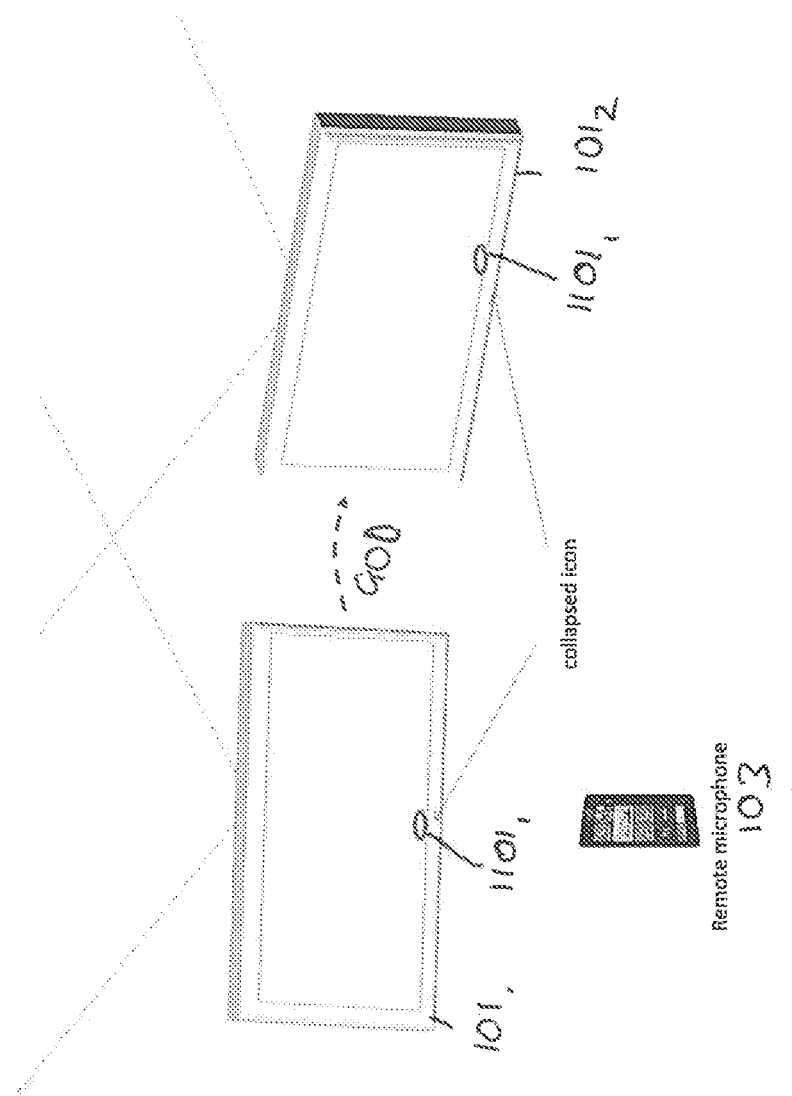

SPATIAL AUDIO APPARATUS

RELATED APPLICATION

This application was originally filed as Patent Cooperation Treaty Application No. PCT/IB2012/057430 filed Dec. 18, 2012.

FIELD

The present application relates to apparatus for spatial audio signal processing. The invention further relates to, but is not limited to, apparatus for spatial audio signal processing within mobile devices.

BACKGROUND

Spatial audio signals are being used in greater frequency to produce a more immersive audio experience. A stereo or multi-channel output can be generated by a listening apparatus such as headphones, headset, multi-channel loudspeaker arrangement.

Furthermore communication between devices or apparatus has enabled multi-device audio capture, where an audio signal output is generated from the output of more than one microphone on more than one device. Typically in multi-device audio capture, one device works as main (or host) device which captures spatial audio (and in some situations video) while at least one other (or remote) device or accessory work as remote auxiliary microphones.

There are many situations where multi-device audio capture is beneficial. For example environments where background/ambient noise level is high as it may be possible to capture audio signals nearer the desired audio source or sources. For example a person located away from the master or host device who is talking can by using a remote microphone capture or record the voice with much better quality than the host or master device located further away. The remote device can then pass the recorded audio which can be used in whatever way required, for example presenting to the user of the host device, storing on the host device, transmitting to a further device to be used etc.

SUMMARY

Aspects of this application thus provide a spatial audio capture and processing whereby listening orientation or video and audio capture orientation differences can be compensated for.

According to a first aspect there is provided an apparatus comprising: an input configured to receive at least one audio signal from a further apparatus; an input configured to receive at least one audio signal associated with the apparatus; an orientation/location determiner configured to determine a relative orientation/location difference between the apparatus and the further apparatus; an audio processor configured to process the at least one audio signal from the further apparatus based on the relative orientation/location difference between the apparatus and the further apparatus; and a combiner configured to combine the at least one audio signal from the further apparatus having been processed and the at least one audio signal associated with the apparatus.

The apparatus may further comprise: a further apparatus representation generator configured to generate a visual representation of the further apparatus based on the relative orientation/location difference between the apparatus and the further apparatus; and a display configured to display the visual representation of the further apparatus.

The apparatus may further comprise: a user interface input configured to receive an input associated with the visual representation defining an initial relative orientation/location difference between the apparatus and the further apparatus; wherein the orientation/location determiner is configured to determine the relative orientation/location difference between the apparatus and the further apparatus based on the initial relative orientation/location difference between the apparatus and the further apparatus.

The apparatus may further comprise an input configured to receive at least one orientation/location indication with respect to the further apparatus, wherein the orientation/location determiner may be configured to determine the relative orientation/location difference between the apparatus and the further apparatus based on the at least one orientation/location indication.

The apparatus may further comprise an orientation/location determiner configured to determine at least one orientation/location for the apparatus, wherein the relative orientation/location determiner may be configured to determine the relative orientation/location difference between the apparatus and the further apparatus based on the at least one orientation/location.

The audio processor may comprise a mapper configured to acoustically map the at least one audio signal from the further apparatus to an orientation/location relative to the apparatus based on the relative orientation/location difference between the apparatus and the further apparatus.

The apparatus may further comprise a delay configured to delay the at least one audio signal associated with the apparatus such that the output of the at least one audio signal from the delay is substantially delayed with respect to the at least one audio signal from the audio processor.

The combiner may comprise a mixer configured to receive a mixing input to alter a ratio of combining the at least one audio signal from the further apparatus having been processed and the at least one audio signal associated with the apparatus.

The apparatus may further comprise at least one of: at least one microphone associated with the apparatus, configured to record the at least one audio signal associated with the apparatus; at least one receiver associated with the apparatus, configured to receive the at least one audio signal associated with the apparatus; and at least one memory associated with the apparatus, configured to retrieve the at least one audio signal associated with the apparatus.

The orientation/location determiner may be configured to track the relative orientation/location difference between the apparatus and the further apparatus.

According to a second aspect there is provided an apparatus comprising at least one processor and at least one memory including computer code for one or more programs, the at least one memory and the computer code configured to with the at least one processor cause the apparatus to at least: receive at least one audio signal from a further apparatus; receive at least one audio signal associated with the apparatus; determine a relative orientation/location difference between the apparatus and the further apparatus; process the at least one audio signal from the further apparatus based on the relative orientation/location difference between the apparatus and the further apparatus; and combine the at least one audio signal from the further apparatus having been processed and the at least one audio signal associated with the apparatus.

The apparatus may be further caused to: generate a visual representation of the further apparatus based on the relative orientation/location difference between the apparatus and the further apparatus; and display the visual representation of the further apparatus.

The apparatus may be further caused to: receive an input associated with the visual representation defining an initial relative orientation/location difference between the apparatus and the further apparatus; and determine the relative orientation/location difference between the apparatus and the further apparatus based on the initial relative orientation/location difference between the apparatus and the further apparatus.

The apparatus may be further caused to receive at least one orientation/location indication with respect to the further apparatus, wherein determining the orientation/location may further causes the apparatus to determine the relative orientation/location difference between the apparatus and the further apparatus based on the at least one orientation/location indication.

The apparatus may further be caused to determine at least one orientation/location for the apparatus, wherein determining the orientation/location may further cause the apparatus to determine the relative orientation/location difference between the apparatus and the further apparatus based on the at least one orientation/location.

The processing of the at least one audio signal may further cause the apparatus to acoustically map the at least one audio signal from the further apparatus to an orientation/location relative to the apparatus based on the relative orientation/location difference between the apparatus and the further apparatus.

The apparatus may be further caused to delay the at least one audio signal associated with the apparatus such that the output of the at least one audio signal from the delay is substantially delayed with respect to the at least one audio signal from the audio processor.

Combining the at least one audio signal from the further apparatus having been processed and the at least one audio signal associated with the apparatus may cause the apparatus to receive a mixing input to alter a ratio of combining the at least one audio signal from the further apparatus having been processed and the at least one audio signal associated with the apparatus.

The apparatus may be caused to at least one of: record the at least one audio signal associated with the apparatus from at least one microphone associated with the apparatus; receive the at least one audio signal associated with the apparatus from at least one receiver; and retrieve the at least one audio signal associated with the apparatus from at least one memory.

Determining a relative orientation/location difference between the apparatus and the further apparatus causes the apparatus to track the relative orientation/location difference between the apparatus and the further apparatus.

According to a third aspect there is provided an apparatus comprising: means for receiving at least one audio signal from a further apparatus; means for receiving at least one audio signal associated with the apparatus; means for determining a relative orientation/location difference between the apparatus and the further apparatus; means for processing the at least one audio signal from the further apparatus based on the relative orientation/location difference between the apparatus and the further apparatus; and means for combining the at least one audio signal from the further apparatus having been processed and the at least one audio signal associated with the apparatus.

The apparatus may further comprise: means for generating a visual representation of the further apparatus based on the relative orientation/location difference between the apparatus and the further apparatus; and means for displaying the visual representation of the further apparatus.

The apparatus may further comprise: means for receiving an input associated with the visual representation defining an initial relative orientation/location difference between the apparatus and the further apparatus; and means for determining the relative orientation/location difference between the apparatus and the further apparatus based on the initial relative orientation/location difference between the apparatus and the further apparatus.

The apparatus may comprise means for receiving at least one orientation/location indication with respect to the further apparatus, wherein the means for determining the orientation/location may further comprise means for determining the relative orientation/location difference between the apparatus and the further apparatus based on the at least one orientation/location indication.

The apparatus may further comprise means for determining at least one orientation/location for the apparatus, wherein the means for determining the orientation/location may further comprise means for determining the relative orientation/location difference between the apparatus and the further apparatus based on the at least one orientation/location.

The means for processing of the at least one audio signal may further comprise means for acoustically mapping the at least one audio signal from the further apparatus to an orientation/location relative to the apparatus based on the relative orientation/location difference between the apparatus and the further apparatus.

The apparatus may further comprise means for delaying the at least one audio signal associated with the apparatus such that the output of the at least one audio signal from the delay is substantially delayed with respect to the at least one audio signal from the audio processor.

The means for combining the at least one audio signal from the further apparatus having been processed and the at least one audio signal associated with the apparatus may comprise means for receiving a mixing input to alter a ratio of combining the at least one audio signal from the further apparatus having been processed and the at least one audio signal associated with the apparatus.

The apparatus may comprise at least one of; means for recording the at least one audio signal associated with the apparatus from at least one microphone associated with the apparatus; means for receiving the at least one audio signal associated with the apparatus from at least one receiver; and means for retrieving the at least one audio signal associated with the apparatus from at least one memory.

The means for determining a relative orientation/location difference between the apparatus and the further apparatus may comprise means for tracking the relative orientation/location difference between the apparatus and the further apparatus.

According to a fourth aspect there is provided a method comprising: receiving at least one audio signal associated with an apparatus; receiving at least one audio signal from a further apparatus; determining a relative orientation/location difference between the apparatus and the further apparatus; processing the at least one audio signal from the further apparatus based on the relative orientation/location difference between the apparatus and the further apparatus; and combining the at least one audio signal from the further apparatus having been processed and the at least one audio signal associated with the apparatus.

The method may further comprise: generating a visual representation of the further apparatus based on the relative orientation/location difference between the apparatus and the further apparatus; and displaying the visual representation of the further apparatus.

The method may further comprise: receiving an input associated with the visual representation defining an initial relative orientation/location difference between the apparatus and the further apparatus; and determining the relative orientation/location difference between the apparatus and the further apparatus based on the initial relative orientation/location difference between the apparatus and the further apparatus.

The method may comprise receiving at least one orientation/location indication with respect to the further apparatus, wherein determining the orientation/location may further comprise determining the relative orientation/location difference between the apparatus and the further apparatus based on the at least one orientation/location indication.

The method may further comprise determining at least one orientation/location for the apparatus, wherein determining the orientation/location may further comprise determining the relative orientation/location difference between the apparatus and the further apparatus based on the at least one orientation/location.

Processing of the at least one audio signal may further comprise acoustically mapping the at least one audio signal from the further apparatus to an orientation/location relative to the apparatus based on the relative orientation/location difference between the apparatus and the further apparatus.

The method may further comprise delaying the at least one audio signal associated with the apparatus such that the output of the at least one audio signal from the delay is substantially delayed with respect to the at least one audio signal from the audio processor.

Combining the at least one audio signal from the further apparatus having been processed and the at least one audio signal associated with the apparatus may comprise receiving a mixing input to alter a ratio of combining the at least one audio signal from the further apparatus having been processed and the at least one audio signal associated with the apparatus.

The method may comprise at least one of: recording the at least one audio signal associated with the apparatus from at least one microphone associated with the apparatus; receiving the at least one audio signal associated with the apparatus from at least one receiver; and retrieving the at least one audio signal associated with the apparatus from at least one memory.

Determining a relative orientation/location difference between the apparatus and the further apparatus may comprise tracking the relative orientation/location difference between the apparatus and the further apparatus.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which:

FIGS. 10 to 12 show schematically example user interface display configurations for the host device according to some embodiments.

EMBODIMENTS

Figure 1:
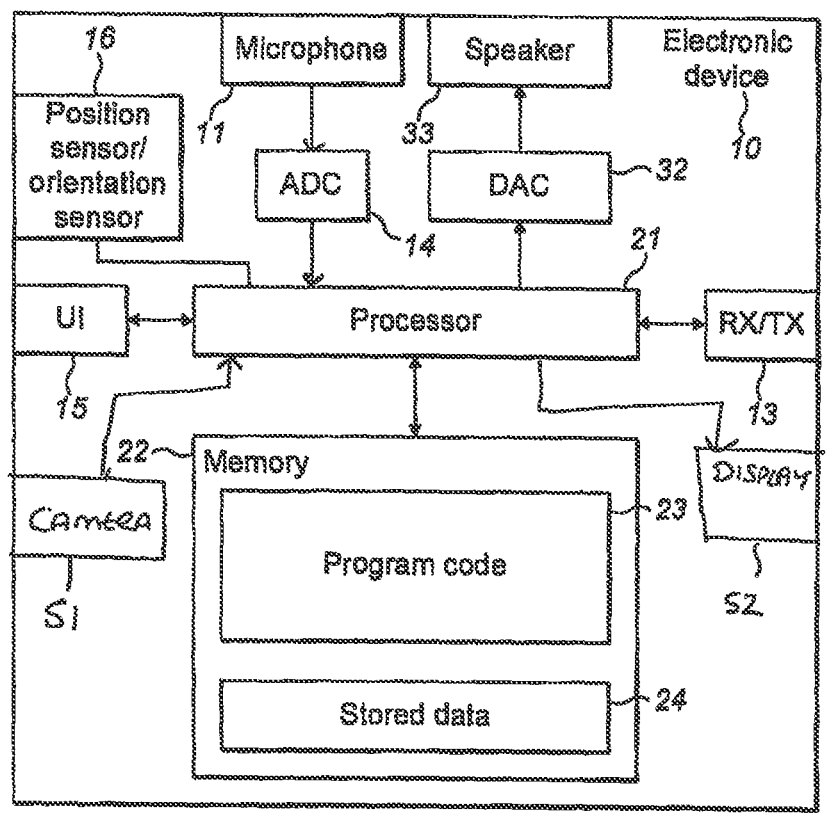
FIG. 1 shows schematically an apparatus suitable for being employed in some embodiments.

The following describes in further detail suitable apparatus and possible mechanisms for the provision of effective management of remote audio sources on a host apparatus for example with respect to orientation or directional processing of audio recordings from remote microphone equipped apparatus within audio-video capture apparatus. In the following examples for simplicity audio signal processing is described separate from any video processing. However it would be appreciated that in some embodiments the audio signal processing is a part of an audio-video system.

As described herein mobile devices or apparatus are more commonly being equipped with multiple microphone configurations or microphone arrays suitable for recording or capturing the audio environment or audio scene surrounding the mobile device or apparatus. This microphone configuration thus enables the possible recording of stereo or surround sound signals. Furthermore mobile devices or apparatus are equipped with suitable transmitting and receiving means to permit a single host device or apparatus to be surrounded by a rich environment of recording devices. The host or master devices can receive the recording or remote device audio signals and in some circumstances mix them with the host device audio signals to generate better quality audio output.

Normally however the remote mobile devices (or remote microphones) audio signals when mixed with the host or master main spatial audio signal are mixed as a monophonic signal panned to the centre of the host or master device audio scene. Thus typically the 'audio' location of the remote microphone signal does not correspond with the actual location of the remote device (or the relative position of the remote device with respect to the host device). Thus any audio source (for example a person speaking through a remote device microphone) which can have a direction or orientation relative to the host device or apparatus is not reflected. As a result, although the remote audio source may have good sound quality, it is not spatially located at the right direction.

This can for example produce poor quality or distracting audio-visual experiences for the user of the host or master device. For example a teleconference application could be envisaged where the remote microphones are the remote device microphones for delegates of the teleconference in different rooms or separated across a busy and noisy room. Where there are multiple remote devices the mixing to the centre would prevent the user of the host device from identifying which remote device delegate is speaking from the direction of the sound, and producing a 'flat and narrow' audio scene.

Although there has been discussions to spatialize remote microphone or remote device audio signals signal to a position where the actual remote device is located. For example in some situations spatialization of remote microphones or devices has been proposed to be implemented by applying a directional audio coding. In such proposals spatial audio capture and encoding a remote device can be implemented by a device with a microphone which also detects a direction of active talker in the conference room and sends location parameters to the master device. The master device receives microphone signals from all devices according to the distributed teleconferencing principle. The master device can then synthesize a spatial representation of the conference participants from the incoming microphone signals and the detected directional information. Thus the master device can perform audio mixing for the monophonic signals from each of the remote devices, but the directional parameters are estimated only from signals coming from one of the devices which performs spatial capture.

Such implementations not only require complicated apparatus configured to determine the directional aspects of the active talker relative to at least one remote capture or recording device further lacks flexibility in not providing control for the user of the host to define or re-define locations of the sound sources.

In the embodiments as described herein within a multi-device audio capture environment, a host device can be configured to capture video (and main spatial audio signal) while one or multiple other 'remote' devices in the same acoustic space also capture or record audio as well (in other words working as wireless remote microphones) and stream their signals to the host device in real time. The host device can in some embodiments treat these other microphone signals as audio objects that it can mix with the spatial audio signal captured by the host device itself. The audio objects (mic signals) in some embodiments are shown as visual icons on the display of the host device. In some embodiments the user of the host device can move and pin (lock) the icons to different places on the display. The position of the icon in the display defines how the remote mic signal is 3D panned when it is mixed with the main spatial audio signal. Furthermore host device orientation detection and visual tracking techniques can in some embodiments enable the remote mic signals to preserve their relative position in the environment or the remote device, for example when the user or host device changes direction (location or orientation).

This can be implemented for example as part of an augmented reality application, an example of which is Nokia City Lens, where a user of a host device points the device to certain direction and objects (such as restaurants the user is looking for) that are in the pointed direction are shown in the device display as visual objects. An augmented reality application thus can combine device orientation detection with maps and location databases.

In this regard reference is first made to FIG. 1 which shows a schematic block diagram of an exemplary apparatus or electronic device 10, which may be used as for example as a host or a remote device.

The electronic device 10 may for example be a mobile terminal or user equipment of a wireless communication system when functioning as the recording apparatus or listening apparatus. In some embodiments the apparatus can be an audio player or audio recorder, such as an MP3 player, a media recorder/player (also known as an MP4 player), or any suitable portable apparatus suitable for recording audio or audio/video camcorder/memory audio or video recorder.

The apparatus 10 can in some embodiments comprise an audio-video subsystem. The audio-video subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 11 is a digital microphone array, in other words configured to generate a digital signal output (and thus not requiring an analogue-to-digital converter). The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'Integrated' microphones containing both audio signal generating and analogue-to-digital conversion capability.

In some embodiments the apparatus 10 audio-video subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio-video subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

In some embodiments the apparatus audio-video subsystem comprises a camera 51 or image capturing means configured to supply to the processor 21 image data. In some embodiments the camera can be configured to supply multiple images over time to provide a video stream.

In some embodiments the apparatus audio-video subsystem comprises a display 52. The display or image display means can be configured to output visual images which can be viewed by the user of the apparatus. In some embodiments the display can be a touch screen display suitable for supplying input data to the apparatus. The display can be any suitable display technology, for example the display can be implemented by a flat panel comprising cells of LCD, LED, OLED, or 'plasma' display implementations.

Although the apparatus 10 is shown having both audio/video capture and audio/video presentation components, it would be understood that in some embodiments the apparatus 10 can comprise one or the other of the audio capture and audio presentation parts of the audio subsystem such that in some embodiments of the apparatus the microphone (for audio capture) or the speaker (for audio presentation) are present. Similarly in some embodiments the apparatus 10 can comprise one or the other of the video capture and video presentation parts of the video subsystem such that in some embodiments the camera 51 (for video capture) or the display 52 (for video presentation) is present.

In some embodiments the apparatus 10 comprises a processor 21. The processor 21 is coupled to the audio-video subsystem and specifically in some examples the analogue-to-digital converter 14 for receiving digital signals representing audio signals from the microphone 11, the digital-to-analogue converter (DAC) 12 configured to output processed digital audio signals, the camera 51 for receiving digital signals representing video signals, and the display 52 configured to output processed digital video signals from the processor 21.

The processor 21 can be configured to execute various program codes. The implemented program codes can comprise for example audio (or audio-video) recording and audio (or audio-video) presentation routines. In some embodiments the program codes can be configured to perform audio signal receiving, processing or mapping or spatial audio signal processing.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments as described herein comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, and a gyroscope or be determined by the motion of the apparatus using the positioning estimate.

It is to be understood again that the structure of the electronic device 10 could be supplemented and varied in many ways.

Figure 2:
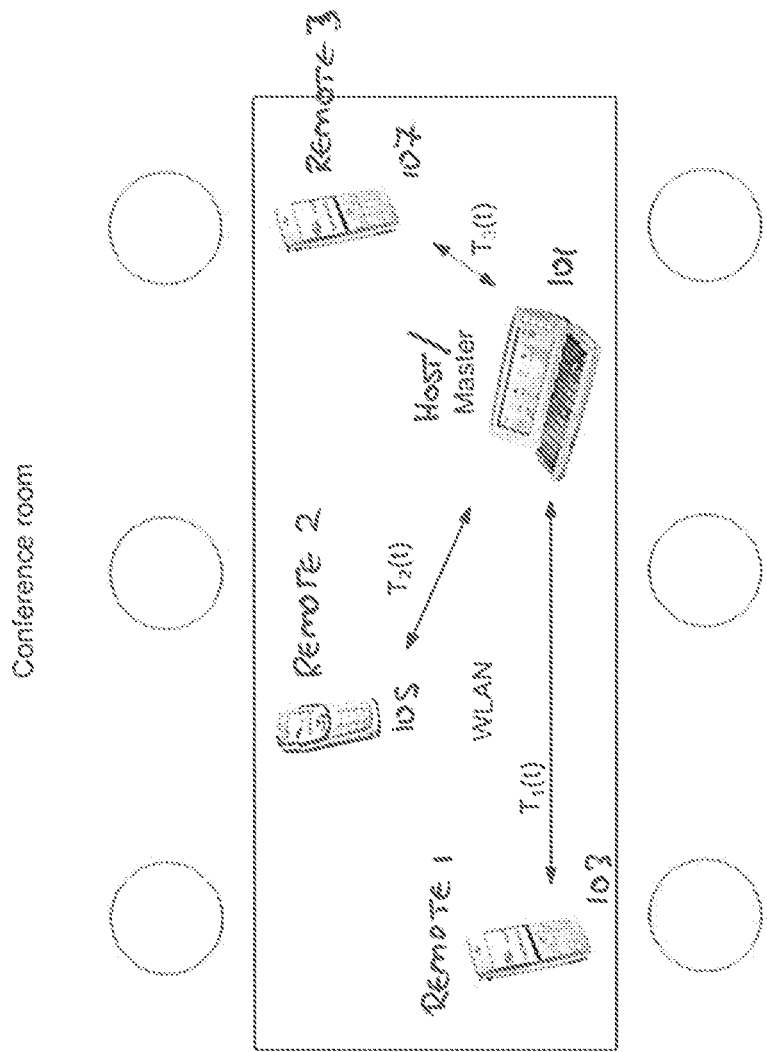
FIG. 2 shows schematically a multi-device system suitable for implementing embodiments as described herein.

With respect to FIG. 2 an example multi-device system suitable for implementing embodiments as described herein is shown.

FIG. 2 shows for example an audio environment, such as the audio scene where a host or master device (or apparatus) 101 can be configured to communicate with a first remote device (or apparatus) remote 1 103 by a first communication link $T_1$, a second remote device (or apparatus) remote 2 105 communicating with the host or master device via a second communications link $T_2$ and a third remote device (or apparatus) remote 3 107 communicating with the host or master device by a third communications link $T_3$. As shown in FIG. 2 the remote devices 103, 105, 107 can be located around the host or master device 101.

Figure 3:
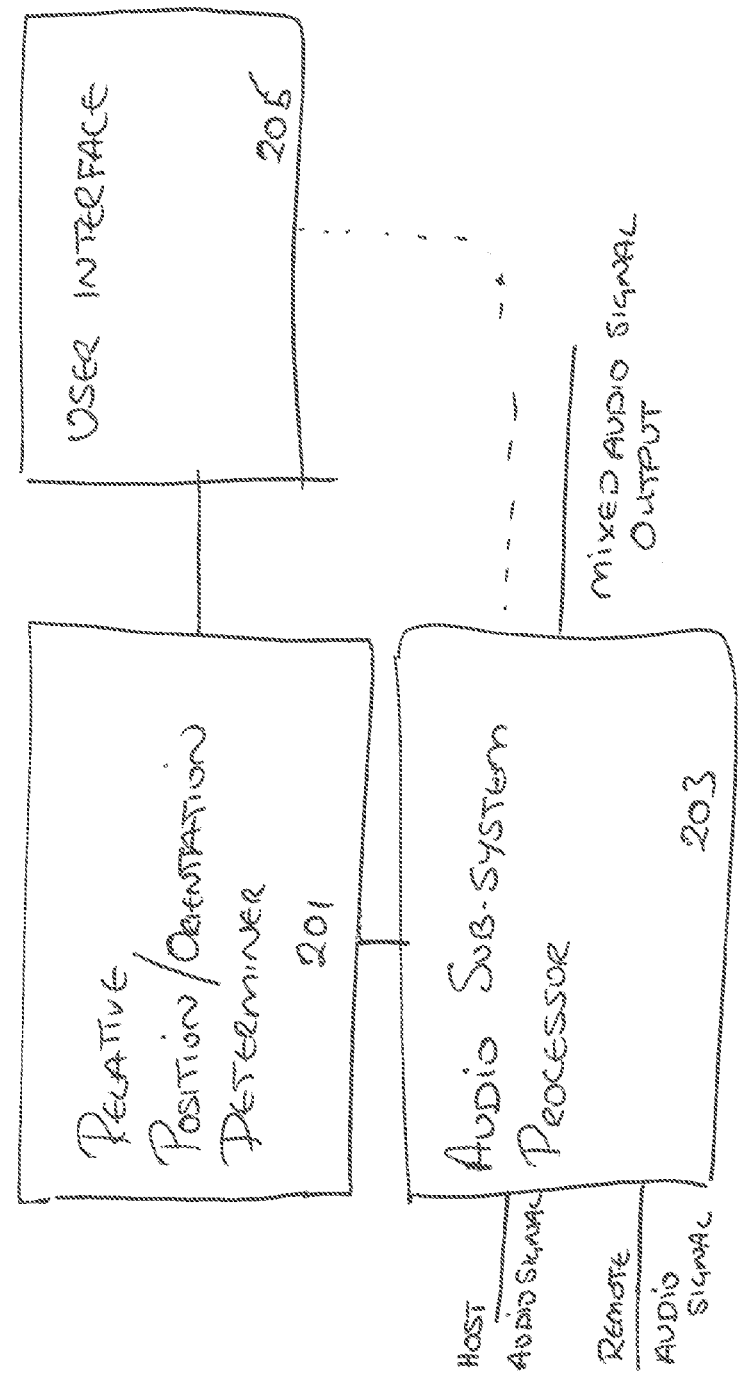
FIG. 3 shows schematically an example host apparatus according to some embodiments.

With respect to FIG. 3 an example host device (or apparatus) according to some embodiments is shown in further detail. Furthermore with respect to FIG. 4 a flow diagram showing the operation of the host device as shown in FIG. 3 is described with respect to some embodiments. In the following examples the apparatus and methods describe the activity of the host device with respect to a single remote device. It would be understood that in some embodiments the host can receive, determine and process (for example spatially process and mix with the host device audio signals) more than one remote device at a time. In other words the host device or apparatus can be configured to receive audio signals from at least one further apparatus or remote device. It would be further be understood that in some embodiments at least one of the at least one further apparatus may output to the apparatus or host device more than one audio signal.

In the following examples audio signals used in audio/visual recording are described, however it would be understood that the same principles as described herein can be used in pure audio signal recording or capturing.

In some embodiments the host device (or apparatus) comprises a relative position/orientation determiner 201 or suitable means for determining position and/or orientation between the host and remote apparatus. The relative position/orientation determiner 201 can in some embodiments be configured to determine a remote-host relative position or orientation value. In other words the relative position/orientation determiner 201 can in some embodiments be configured to determine the position or orientation of the remote device as 'experienced' by the host device. As is described herein the relative position/orientation can be a selection or combination of host device position/orientation, remote device position/orientation and further user interface position/orientation shift or modification. For example in some embodiments the relative position/orientation determiner 201 comprises a compass or orientation sensor which determines an orientation of the host device and a remote device orientation vector which defines the orientation value or direction of the remote device from the host device. For example the remote device can be located true north (N or 0 degrees) from the host device and the host device orientated as north west (NW or 315 degrees) and the relative position/orientation determiner 201 generating a right 45 degrees orientation value. In other words the location of the remote device is 45 degrees to the right as experienced by the host device.

Figure 4:
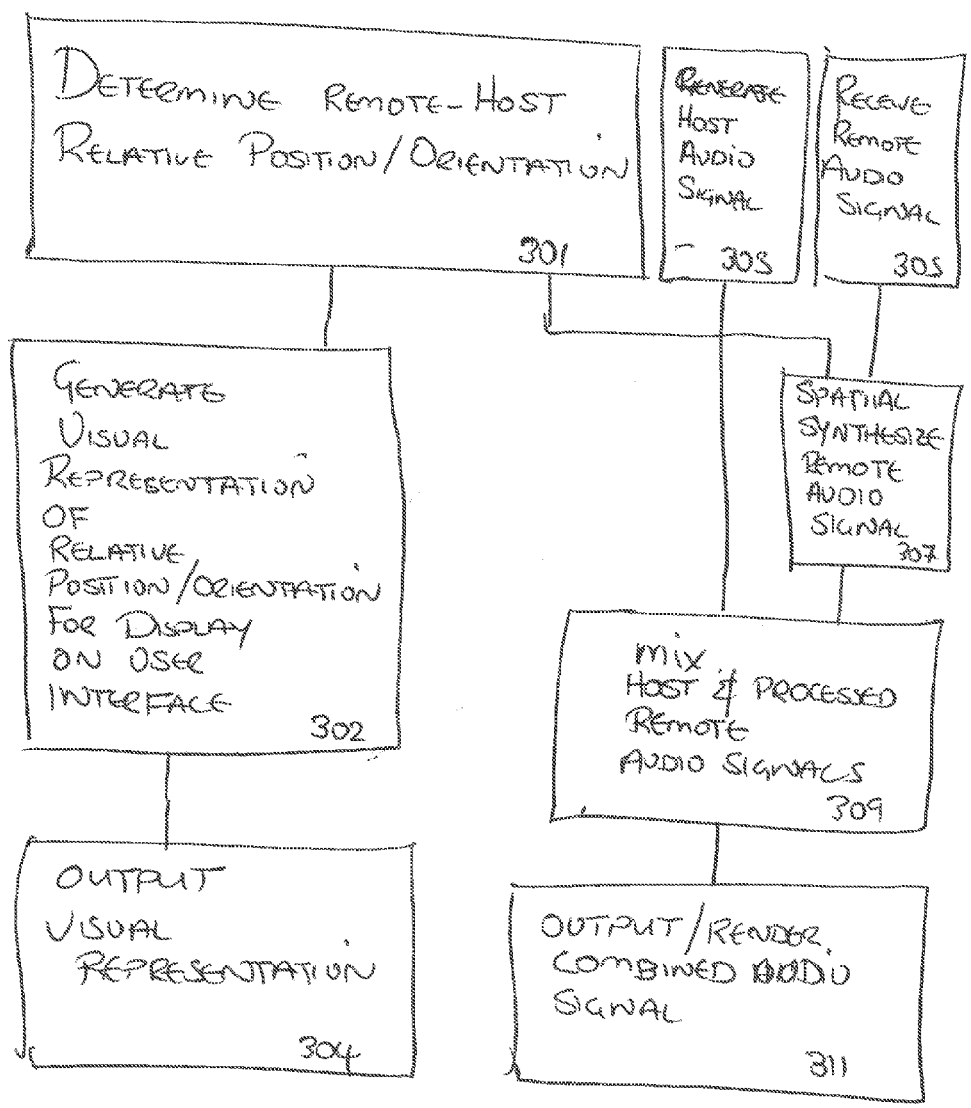
FIG. 4 shows schematically a flow diagram of the operation of the host apparatus shown in FIG. 3 according to some embodiments.

The operation of determining a remote-host relative position or orientation is shown in FIG. 4 by step 301.

In some embodiments the relative position/orientation determiner 201 is configured to output the relative position/orientation value to the audio subsystem processor 203. Similarly in some embodiments the relative position/orientation determiner 201 is configured to output the relative position/orientation value to a user interface 205.

In some embodiments the host device or apparatus comprises a user interface 205 or suitable means for providing information to the user and providing the user an input for entering data such as for example information or selections. The user interface 205 can as described herein comprise a touch screen display suitable for both displaying information and providing an input from the user.

In some embodiments the user interface 205 can be configured to generate a visual representation of the relative position/orientation for display on the user interface. For example in some embodiments the user interface 205 comprises a display 52 configured to output a suitable graphical representation of the relative location of the remote device. For example in some embodiments the user interface 205 can be configured to generate a graphical icon representing the remote device. In some embodiments the graphical icon can be located on a 'radar' type map with the host apparatus at the centre and remote icon plotted on the map at the relative orientation value—using the above example the remote device icon would be located on the 'radar' map at 45 degrees NE. In some embodiments the radar map can display a sector or part of the full surrounding environment, for example the sector visible by the camera image displayed on the screen and as such is affected by the camera depth of view. However it would be understood that the graphical representation can be any form showing the relative direction, such as for example an overlay on a map, plan or projection of the audio scene, or an augmentation of a camera image displayed on the display.

The operation of generating a visual representation of the relative position orientation for display on a user interface is shown in FIG. 4 by step 302.

Furthermore the user interface 205 can then output, for example via the display 52 the visual representation for the user to see.

The operation of outputting the visual representation of the relative position/orientation is shown in FIG. 4 by step 304.

In some embodiments the host device (or apparatus) comprises an audio subsystem processor 203 or suitable means for audio signal capture and/or processing. The audio subsystem processor 203 can in some embodiments be configured to receive at least one host recorded (or captured) audio signal. (Or in some embodiments means for recording or capturing an audio signal). For example as described herein the host device or apparatus can comprise a microphone array configured to record or capture multi-channel audio signals suitable for spatial audio processing. The microphone array audio signals can be passed to the audio subsystem processor. It would be understood that in some embodiments the host apparatus audio signal is received for example an audio signal received over the air downloaded from a cloud or server, cellular or non-cellular communications link, a Bluetooth (BT), wireless local area network (WLAN), or recovered or retrieved from memory.

The operation of generating or receiving the host audio signal is shown in FIG. 4 by step 303.

Furthermore the audio subsystem processor 203 can be configured to receive from the remote device a suitable audio signal or signals, or means for receiving an audio signal or signals from a remote device. The audio signal(s) from the remote device can be received in some embodiments via the transceiver 13 and be any number of channels, encoding or format. For example in some embodiments the remote device audio signal is a mono audio signal, however it would be appreciated that the remote device audio signal can be a stereo or multichannel audio signal.

The operation of receiving the remote audio signals from the remote device is shown in FIG. 4 by step 305.

In some embodiments the audio subsystem processor 203 can be configured to spatially synthesise the remote audio signal based on the relative position/orientation determiner 201 value. In other words the audio subsystem processor 203 can in some embodiments comprise means for spatial synthesising the remote audio signal.

Thus as the relative position and orientation between the host and the remote devices changes, for example as the host device rotates or moves (or the remote device moves) then the audio subsystem processor can spatially synthesise the remote audio signal to reflect this change. Thus using the examples described herein a mono audio signal from the remote device can in some embodiments be mapped or processed to the 'front-right' of the audio scene such that the audio signal is experienced as coming from a direction substantially at 45 degrees to the right of centre, for example a suitable head related transfer function (HRTF) or head related impulse response (HRIR) is applied to the audio signal to map the audio signal to the left and right channels with a suitable front right directional bias.

The operation of spatially synthesising the removed audio signal is shown in FIG. 4 by step 307.

In some embodiments the audio subsystem processor can further be configured to mix the host device and processed remote device audio signals. In other words the audio subsystem processor 203 can in some embodiments comprise means for mixing. It would be understood that the mixing of the audio signals can be an equal or unequal mixing of the audio signals. In some embodiments the audio subsystem can be configured to perform additional processing such as upmixing, downmixing, sample rate change, and synchronising of the host device and processed remote device audio signals prior to mixing. Thus using the example above the remote device audio signal is mapped to the front and right and is mixed with the host device audio signals to generate a mixed audio signal. In other words the processor thus generates a combined audio signal comprising the host recorded audio signal and a remote audio signal which is experienced by the host device user as coming from 45 degrees to the right of the centre (in other words at substantially the same direction from which the remote device can be seen from the host device).

The operation of mixing the host device and processed remote device audio signals is shown in FIG. 4 by step 309.

The audio subsystem processor 203 can then be configured to output the mixed audio signal.

The operation of outputting or rendering the combined or mixed audio signal is shown in FIG. 4 by step 311.

Figure 5:
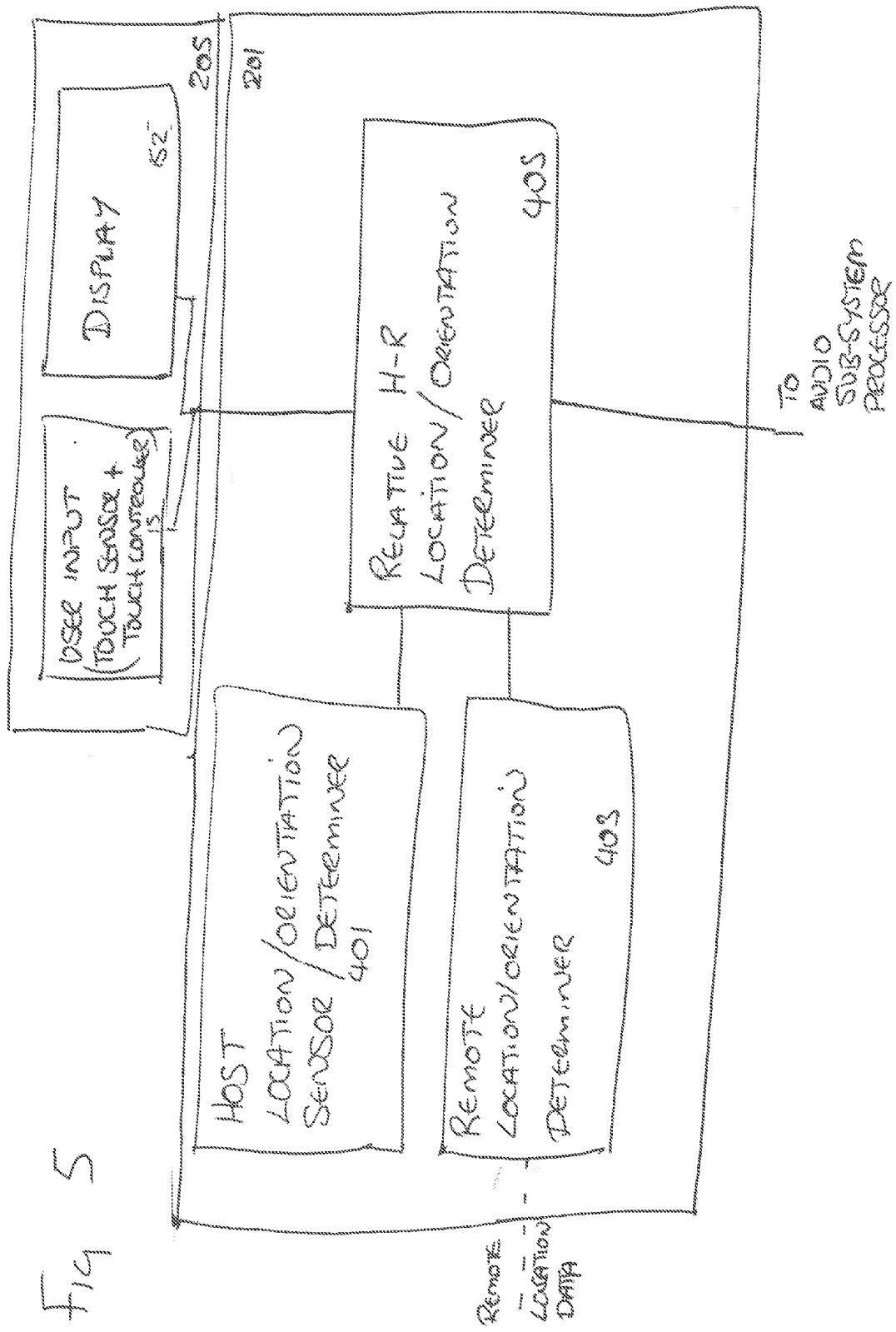
FIG. 5 shows schematically an example user interface and relative position/orientation determiner as shown in FIG. 3 according to some embodiments.
Figure 6:
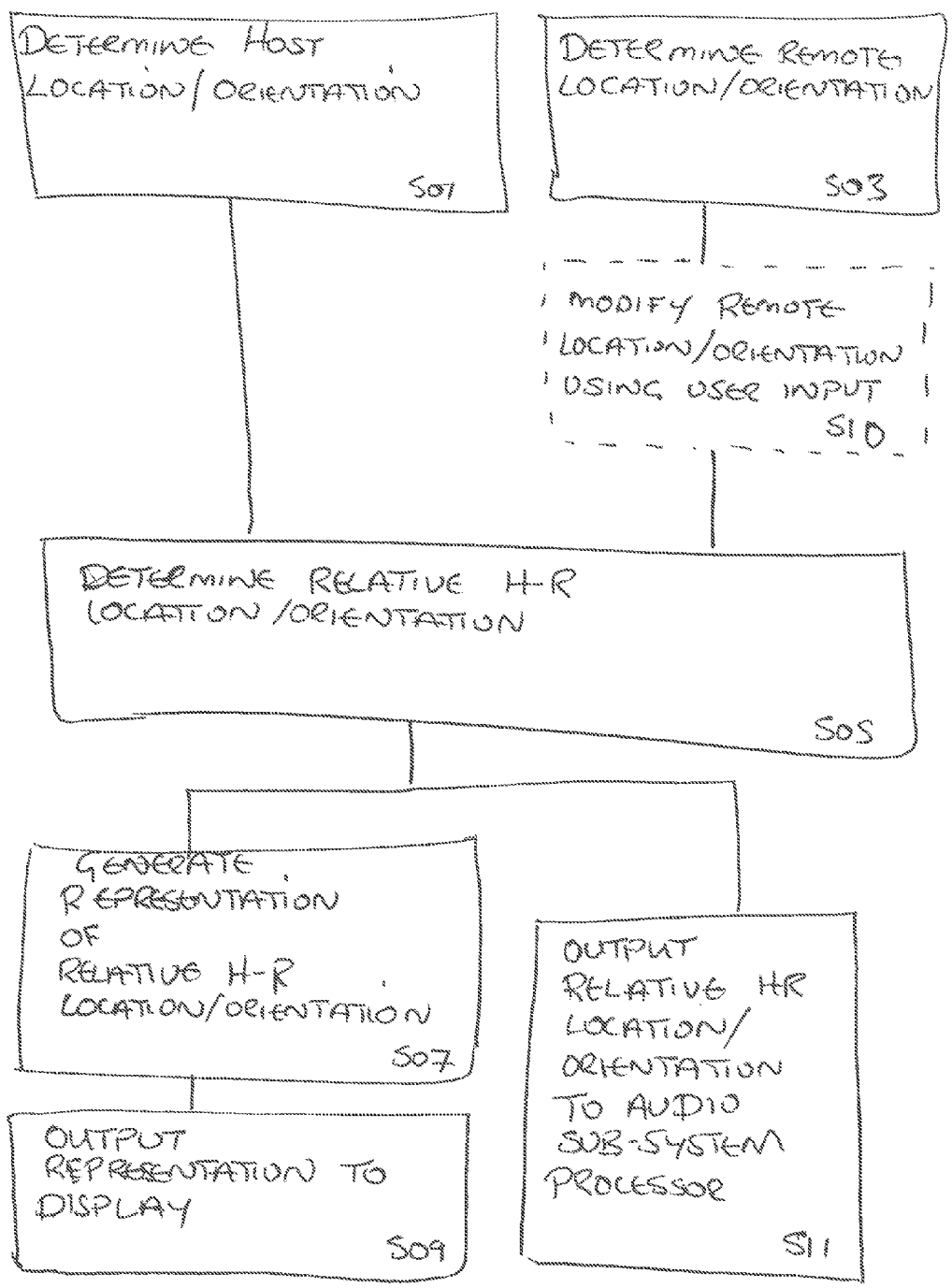
FIG. 6 shows schematically a flow diagram of the operation of the relative position/orientation determiner shown in FIG. 5 according to some embodiments.

With respect to FIG. 5 an example relative position/orientation determiner 201 according to some embodiments is shown in further detail. Furthermore in FIG. 5 an example user interface 205 according to some embodiments is shown in further detail. FIG. 6 shows a flow diagram showing the operation of the example relative position/orientation determiner 201 and user interface 205 as shown in FIG. 5 according to some embodiments.

In some embodiments the relative position/orientation determiner 201 comprises a host location/orientation sensor (or determiner) 401 or suitable means for determining the host device location and/or orientation. In some embodiments the host location/orientation sensor (or determiner) 401 comprises an orientation sensor as described herein configured to determine the orientation of the host relative to a defined orientation (for example magnetic north or 0 degrees). The host location/orientation sensor (or determiner) 401 can in some embodiments be configured to output an orientation value to a relative host-remote location/orientation determiner 405. In some embodiments the host location/orientation sensor (or determiner) 401 operates to determine changes in the current orientation of the host device and indicate the orientation changes to the relative host-remote determiner 405.

In some embodiments the host location/orientation sensor (or determiner) 401 comprises a position or location estimator (or suitable means for determining a host device position or location), for example a satellite positioning receiver and thus can be configured to generate a positional estimate of the host device. It would be understood that the position or location estimator can in some embodiments be configured to use any suitable location estimation method, for example other radio beacon location determination, inertial location estimation etc.

In some embodiments both the position or location and the orientation of the host can be determined by the host location/orientation sensor 401.

In some embodiments the host location/orientation sensor (or determiner) 401 is configured to receive images from a camera, such as the device camera and further configured to determine an orientation or location (or any motion of orientation or location) of the host device. In other words in some embodiments the apparatus comprises suitable image recording means or input means for receiving recorded images. For example the host location/orientation sensor (or determiner 401) can be configured to determine any change in location or orientation of the host device by changes in the image captured by the camera. In some embodiments the host location/orientation sensor (or determiner) 401 comprises an image feature or block motion estimation determiner similar to that used in video encoding motion compensation for predictive frame estimation purposes. Thus by determining motion in the image, for example motion of background features, the host location/orientation determiner can determine an estimated motion or orientation change of the host device.

The operation of determining the host location or orientation estimate is shown in FIG. 6 by step 501.

In some embodiments the relative position/orientation determiner 201 comprises a remote location/orientation determiner 403 or suitable means for determining relative position and/or orientation. The remote location/orientation determiner 403 in some embodiments can be configured to receive, for example via the transceiver, an indicator from the remote device defining the location and/or orientation of the remote device.

For example the remote device can be equipped with any suitable means for determining the location and/or orientation of the remote device. In some embodiments the remote device comprises a satellite positioning estimator similar to those described herein and be configured to estimate the position of the remote device using the satellite signals (or some other beacon or radio signal method) and transmit this to the host device. Similarly the remote device can comprise an orientation sensor such as a compass or gyroscope and similarly determine the orientation of the remote device relative to a directional or orientation reference. In some embodiments the remote location/orientation determiner 403 can then transmit this location and/or orientation data as the indicator.

In some embodiments the remote location/orientation determiner 403 can be configured to determine a remote location/orientation using suitable means on the host device. For example in some embodiments the remote location/orientation determiner can be configured to receive images from the host device camera. The images can then be analysed by the remote location/orientation determiner 403 to identify features in the image as the remote device (or in some embodiments as being representative of the remote device). These features can then be tracked on a frame by frame basis to determine an approximate location/orientation of the remote device (and which is further relative to the host device). The identification of the feature in the image can in some embodiments be determined automatically (for example by image recognition or active beacon from the remote device), semi-automatically (for example by the user assisting the apparatus to identify one from a candidate list of possible remote devices), or manually (for example by the user selecting a position on the image as displayed).

The remote location/orientation information can be passed to the relative host-remote location/orientation determiner 405.

The operation of determining the remote location/orientation estimate is shown in FIG. 6 by step 503.

In some embodiments the user interface 205 comprises a display 52 or suitable means for displaying images, as described herein and configured to display graphical images to the user. Furthermore in some embodiments the user interface 205 comprises a user input 15 or suitable means for providing a user input, such as a touch sensor or touch controller which in some embodiments operates in conjunction with the display 52 to produce a touch screen display. The touch sensor or touch controller user input 15 can in some embodiments be used to provide an additional input for (or control the operation of) the relative host-remote location/orientation determiner 405. For example in some embodiments the user input 15 can be used to modify the location or orientation of the remote device as determined by the remote location/orientation determiner 403 using a user input. For example in some embodiments the user interface 15 can as described herein be used to define an initial or current remote device location and/or orientation on the display where the display is generating a map of the area, map or plan of the surrounding area for the host device, or an image captured by the host device camera.

In the following examples the user input is configured to affect the remote device location and/or orientation determination, however it would be understood that in some embodiments the user input 15 can be used to affect the relative host-remote location and/or orientation determination directly. In other words the audio signal of the further apparatus can be represented as an object on the display and in some embodiments the user interface is configured to modify or edit the location of the representation and therefore the audio signal location. Therefore in some embodiments the visual representation or graphical representation is considered to be that of the further apparatus or remote device and in some embodiments the visual representation or graphical representation is considered to be that of the at least one audio signal from the further apparatus or remote device.

The operation of modifying the remote location and/or orientation using a user input is shown in FIG. 6 by the dashed box step 510.

In some embodiments the relative position/orientation determiner 201 comprises a relative host-remote location/orientation determiner 405 or suitable means for determining a host to remote location and/or orientation difference. In some embodiments the relative host-remote location/orientation determiner 405 can be configured to receive host location and/or orientation information from the host location/orientation sensor (or determiner) 401, and remote location and/or orientation information from the remote location/orientation determiner 403.

Furthermore in some embodiments the relative host-remote location/orientation determiner 405 can receive a further input from the user interface 205 (for example to affect the remote device location and/or orientation determination or the relative host-remote location and/or orientation determination).

The relative host-remote location/orientation determiner 405 can be configured to determine a relative host to remote location and/or orientation estimate based on at least one of the remote device location and/or orientation estimate and the host device location and/or orientation estimate.

For example as described herein with respect to the orientation estimation example in FIGS. 3 and 4, the relative host-remote location/orientation determiner generates an estimation of the relative orientation of the remote device from the viewpoint of the host device using an initial defined remote orientation from the remote location/orientation determiner 403 which is then updated by the output of the host location/orientation sensor 401. However it can be envisaged that the relative host-remote location/orientation determiner can determine a relative host to remote location and/or orientation estimation according to any suitable manner. For example by determining the relative orientation of the remote device from the host device by calculating the difference in absolute location estimates generated by both the host and remote location determiners.

The operation of determining the relative host to remote location or orientation estimate is shown in FIG. 6 by step 505.

In some embodiments the relative host to remote location estimate can be passed to the user interface 205. The user interface 205 can in some embodiments be configured to generate a graphical representation of the relative host to remote location and/or orientation. For example a graphical icon can be generated at a position to be displayed on the display 52 image.

The generation of a representation of the relative host remote location orientation is shown in FIG. 6 by step 507.

The display 52 can then be configured to output the representation.

The outputting of the representation to the display is shown in FIG. 6 by step 509.

Thus in some embodiments a graphical representation can be overlaid over the image captured by the camera displayed on the display indicating a visual representation of the remote device from the viewpoint of the host device. However the graphical representation can in some embodiments be any suitable format and as described herein can be a radar map surrounding the host device, a map or plan of the area on which is displayed the graphical representation of the remote device.

Furthermore in some embodiments the relative host to remote location and/or orientation information can be passed to the audio subsystem processor.

The output the graphical representation of the relative host remote location and/or orientation information to the audio subsystem processor is shown in FIG. 6 by step 511.

Figure 7:
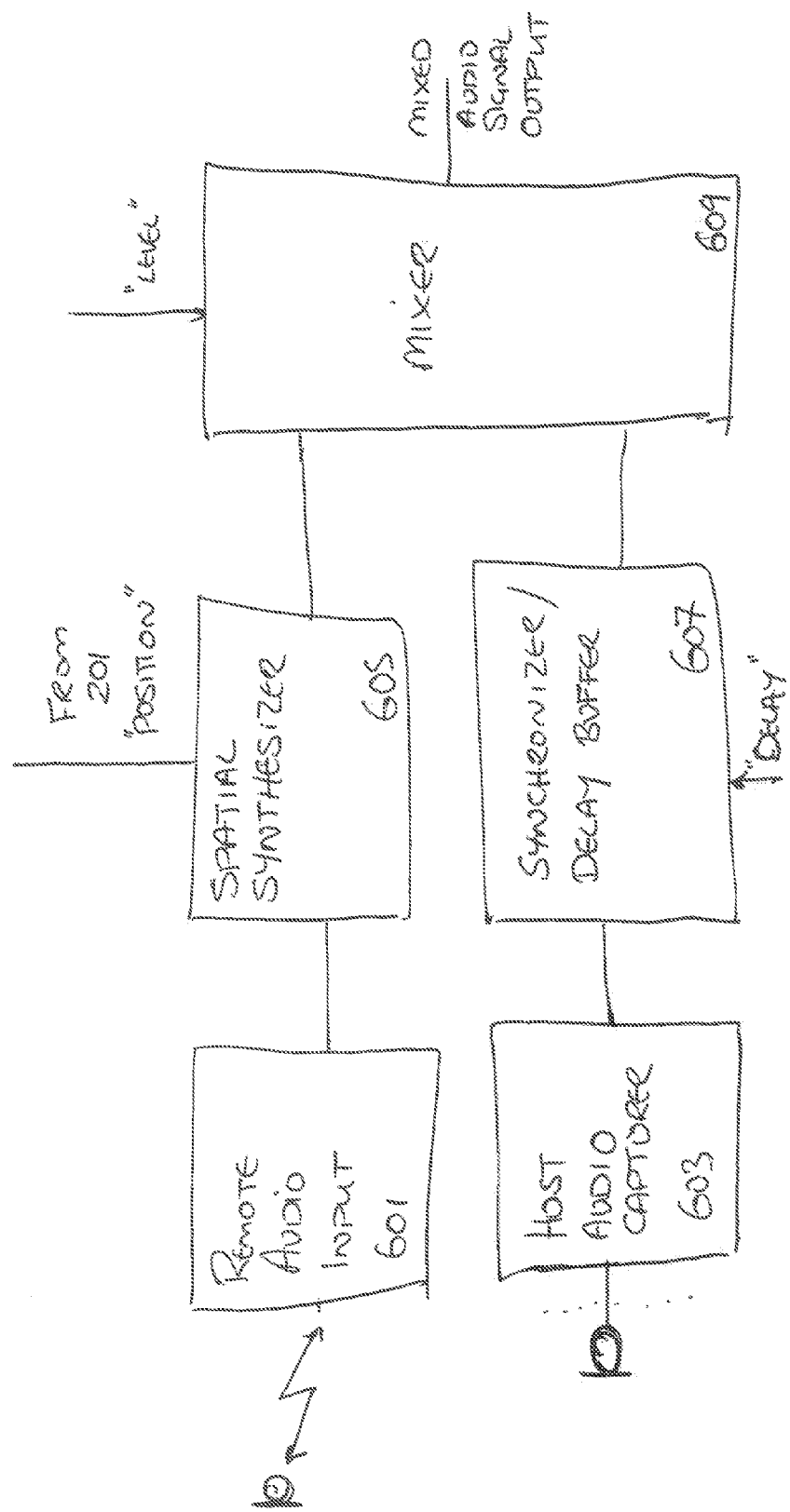
FIG. 7 shows schematically an example audio sub-system processor as shown in FIG. 3 according to some embodiments.

With respect to FIG. 7 an example audio subsystem processor 203 is shown in further detail. Furthermore with respect to FIG. 8 a flow diagram of the operation of the example audio subsystem processor 203 as shown in FIG. 7 is shown.

In some embodiments the audio subsystem processor 203 comprises a remote audio input 601. The remote audio input 601 is configured to receive at least one remote device audio signal from the remote device. The at least one remote device audio signal can be any suitable audio signal format. For example in some embodiments the remote device audio signal is a Mono audio signal, however in some embodiments the remote audio signal can be a stereo recorded audio signal or multichannel audio signal. In some embodiments the remote audio input 601 is further configured to process or pre-process the audio input. The pre-processing can for example be an equalisation operation, a range limiting operation, a sample conversion, or word length conversion operation or in some embodiments to decode the remote device audio signal from an encoded audio signal format suitable for transmission into an audio format suitable for processing.

Figure 8:
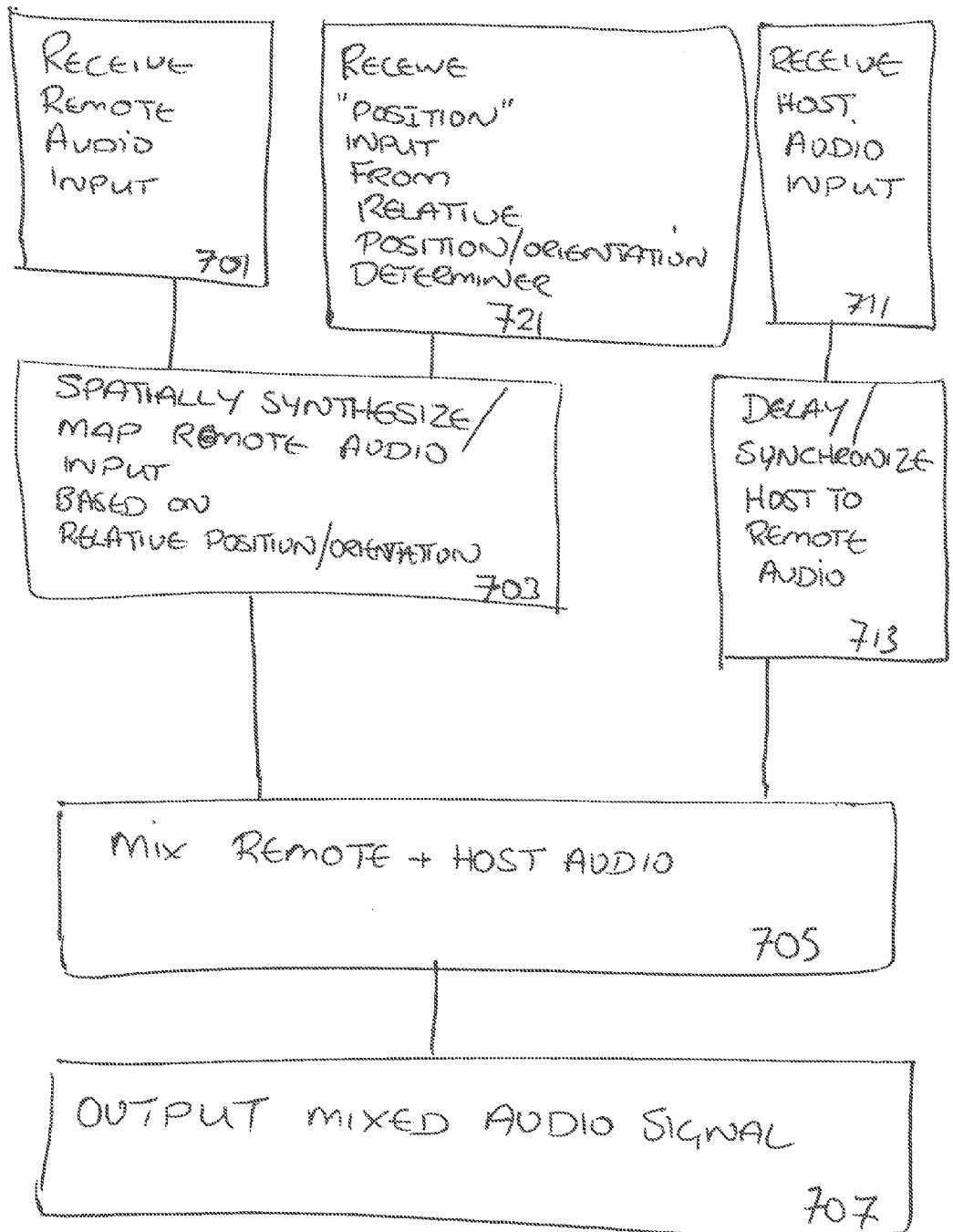
FIG. 8 shows schematically a flow diagram of the operation of the audio sub-system processor shown in FIG. 7 according to some embodiments.

The operation of receiving the remote device audio input is shown in FIG. 8 by step 701.

The at least one remote audio input remote audio signal is in some embodiments passed to the spatial synthesiser 605.

In some embodiments the audio subsystem processor comprises a spatial synthesiser 605. The spatial synthesiser 605 is configured in some embodiments to receive the remote audio signal from the remote audio input 601 and furthermore receive from the relative position/orientation determiner 201 a position and/or orientation indicator representing either a position/orientation or motion of the position/orientation. The input shown in FIG. 7 shows a 'position' input representing a relative position of the remote device from the host device.

The operation of receiving the 'position' input from the relative position/orientation determiner is shown in FIG. 8 by step 721.

The spatial synthesiser 605, having received the at least one audio signal from the remote device and the 'position' (and/or orientation) input from the relative position/orientation determiner 201, can in some embodiments be configured to spatially synthesise the at least one remote device audio signal.

In some embodiments the spatial synthesis of the audio signal comprises a mapping operation on the at least one remote device audio signal based on the 'position' input value. In some embodiments this can comprise assigning a direction or orientation relative to the host device for multichannel synthesis in other words mapping the remote device audio signal to suitable multichannel channels. This can for example be performed in stereo channel mapping by applying a head related transfer function (HRTF) or similar to the remote device audio signal where by the HRTF is determined by the 'position' input. In other words the audio signal is directed according to the defined 'position' input. In some embodiments the remote signal can be a previously directionally processed multichannel signal on which the mapping operation may comprise a rotation of the sound scene. In some embodiments the spatial synthesis can comprise artificial room effect processing of either the host audio signal and/or the remote audio signals. In other words the audio signals from one of the host or remote devices is processed to provide a better match and thus prevent 'acoustic' discontinuities producing a jarring effect.

The spatial synthesiser 605 in some embodiments can output the spatially synthesised remote device audio signal to a mixer 609.

The operation of spatially synthesising or mapping the remote device audio signal based on the relative position/orientation value is shown in FIG. 8 by step 703.

In some embodiments the audio subsystem processor 203 comprises a host audio capturer 603. The host audio capturer 603 is in some embodiments configured to receive audio signals from the host device microphones (or microphones not directly coupled to but associated with the host device). In some embodiments the host audio capturer 603 (or input) is configured to receive a spatial or multichannel audio signal input suitable for generating spatial audio output from the microphones. For example in some embodiments the host audio capturer receives the audio signal. The host audio capturer 603 in some embodiments can be configured to receive the audio signal over 'the air' or downloaded from the 'cloud' or a server. In some embodiments the host audio capturer 603 can be configured to receive the audio signal from a, cellular or non-cellular communications link, for example a Bluetooth (BT) or wireless local area network (WLAN) communications. In some embodiments the host audio capturer can be configured to recover or retrieve the audio signal from a memory.

The host audio capturer 603 in some embodiments can be configured to pre-process the audio signals received from the microphones in a manner described with respect to the remote audio signals herein.

The host audio capturer 603 can further in some embodiments be configured to output the host audio signal or signals to a synchroniser or delay buffer 607.

The operation of receiving the host audio input is shown in FIG. 8 by step 711.

In some embodiments the audio subsystem processor 203 comprises a synchroniser or delay buffer 607. The synchroniser or delay buffer 607 is configured in some embodiments to delay or synchronise the output of the host audio signals with the output of the spatial synthesiser 605 such that the audio signals reaching the mixer are substantially synchronised.

In some embodiments the synchroniser (or delay buffer) 607 is configured to receive a delay input indicating the delay value required to synchronise the two audio signals (the host and the processed remote device audio signals). In some embodiments the delay signal can be received from the spatial synthesiser 605 which generates an estimate of the delay imposed on the remote device audio signals by the spatial synthesis operations.

The operation of delaying for synchronising the host to remote audio signals is shown in FIG. 8 by step 713.

In some embodiments the synchroniser/delay buffer 607 is configured to output the synchronised or delayed host audio signals to the mixer 609.

In some embodiments the audio subsystem processor 203 comprises a mixer 609. The mixer 609 can be configured to receive the spatially synthesised remote device audio signals, and the synchronised or delayed host device audio signals. The mixer 609 can further configured to receive a "level" input. The level input can in some embodiments be received from the user interface and can be used in some embodiments to determine the ratio of mixing the remote device and host device audio signals. The mixer 609 can in some embodiments then combine the host device and remote device audio signals in the ratio of mixing as determined by the 'level' input value.

The mixer can then output the mixed audio signals to be used, stored or further processed.

The mixing of the remote device and host device audio signals is shown in FIG. 8 by step 705.

The outputting of the mixed audio signals is shown in FIG. 8 by step 707.

With respect to FIG. 9 and FIGS. 10 to 12 further example use cases of the embodiments described herein are described further.

Figure 9:
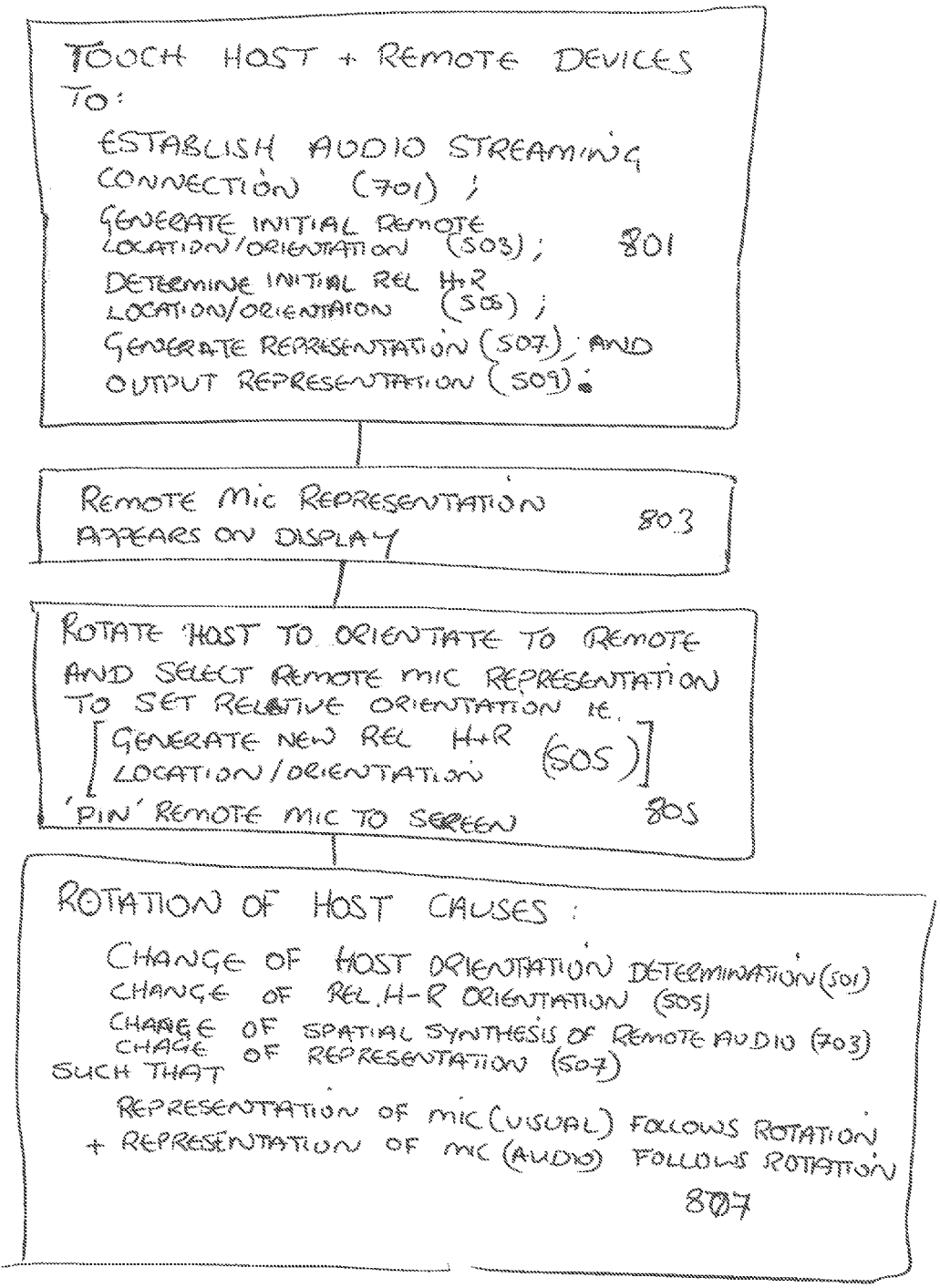
FIG. 9 shows schematically a flow diagram of an example use case of the host apparatus as shown in FIG. 3 according to some embodiments.

With respect to FIG. 9 an example use case flow diagram is shown.

The use case described herein is one where the host device and remote device are configured to initially communicate with each other by physically 'touch together' the two devices and communicating handshake and other communication protocols to initiate the further communication or linking between the two devices. These can be generated for example by near field communication (NFC) transceivers which allow the host and remote devices to identify and initiate other communication links between the two in some embodiments.

For example the touching the host and remote devices together can be configured to establish an audio streaming connection, in other words be configured to start receiving at the host device a remote device audio signal input as shown in FIG. 8 by step 701. Furthermore the touching the host and remote devices together can enable the host device to generate an initial remote location or orientation determination such as shown in FIG. 6 by step 503, and furthermore to determine the initial relative host to remote location orientation such as shown in FIG. 6 by step 505.

Furthermore in some embodiments the touching the host and remote devices together can generate a visual representation of the remote device on the host device such as shown in FIG. 6 by step 507 and output this representation on the display such as shown in FIG. 6 by step 509.

The touching of the host and remote devices together and the initiation of audio signal processing is shown in FIG. 9 by step 801.

It would be understood that in some embodiments the coupling or linking between the devices can be initiated by any suitable means as well as the physical touching as described herein.

The host device can then output to the display the remote device or microphone representation.

The display of the graphical representation of the remote device or microphone on the display is shown in FIG. 9 by step 803.

The situation at this point can be shown with regards an embodiment with respect to FIG. 10. FIG. 10 shows a host device 101 at two positions a first position shown by the host device 101$_1$ and a second position shown by the host device representation 101$_2$. The first and second positions are separated by a left to right rotation 901 as the host device moves from the first to the second position. Furthermore FIG. 10 shows the example embodiment where the display outputs the camera image which comprises the visual representation of the remote device 103. In the example shown in FIG. 10 when the host device is in the first position 101$_1$ the displayed camera image shows the remote device 903$_1$ located towards the right-hand side of the display and in the second position 101$_2$ shows the remote device 903$_2$ located to the left-hand side of the display. Furthermore the 'generated' graphical representation of the remote (microphone) device (shown on the display by the text display M1) is initially located in the centre of the display 905$_1$ and 905$_2$. Thus in other words the remote audio signals are centrally mixed with any recorded or captured host audio signals.

In the use case described herein the host device can be rotated to orientate the host device towards the remote device. The host device can then via the user interface 'pin' the representation of the remote device to this orientation. This can for example be performed by selecting the display part showing the graphical representation of the remote device when pointing 'directly' at the remote device in order to set an initial relative or remote reference orientation. In other words the host device is configured to generate a new relative host to remote orientation as shown in FIG. 6 by step 505.

The setting of a reference orientation enables the generation of the graphical representation of the remote device and furthermore the tracking or following of the reference orientation even when the host device is further rotated or moved. For example with respect to FIG. 11 the host device in the first position 101$_1$ (oriented to the left of the reference orientation) showing a graphical representation of the remote device (microphone) M1 1005$_1$ to the right of the display (and effectively over the visual image of the remote device 901$_1$). Also as shown in FIG. 11 when the host device is rotated 901 (or the remote device moves in some embodiments) the graphical representation of the remote device 1005$_2$ follows the visual image on the screen.

In other words the rotation of the host device (as determined by the host location/orientation sensor (or determiner)) can cause the device to change the host orientation determination such as shown in FIG. 6 by step 501, change the relative host to remote orientation value such as shown in FIG. 6 by step 505, change the spatial synthesis of the remote audio such as shown in FIG. 8 by step 703, and change the representation of the remote device (microphone) such as shown in FIG. 6 by step 507 such that both the graphical representation of the remote device (microphone M1) on the display follows the rotation and the audio representation of the remote device in the audio scene follows the rotation. In other words that even if the host device is rotated, the user of the host device can perceive the microphone signal recorded by the remote device to keep its position relatively to the physical environment.

In some embodiments it would be understood that the relative motion of the devices can be due to the motion of the remote device. In other words the host device has a fixed position/orientation, but the remote device itself is moving. In such embodiments the relative position/orientation determination and display of the representation for example M1 of the remote device can in some embodiments follow the "image" of the remote device or real object on the display. This relative orientation/location determination can be performed as described herein where the location/orientation of the remote device is tracked by sensors.

The tracking or following of the representation (graphical and audio) are shown in FIG. 9 by step 807.

With respect to FIG. 12 an further example graphical representation of the remote device (or microphone) is shown where by the remote device is located 'behind' the apparatus, in other words not in within the field of view of the camera. In such examples the graphical representation of the remote device or microphone 103 can be a collapsed icon such as shown in FIG. 12 in the host device in both the first 101$_1$ and second 101$_2$ positions show a collapsed icon 1101$_1$ 1101$_2$ respectively.

It would be understood that the user interface as described herein are example user interface implementations only.

It shall be appreciated that the term user equipment is intended to cover any suitable type of wireless user equipment, such as mobile telephones, portable data processing devices or portable web browsers, as well as wearable devices.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   receiving at least one audio signal associated with an apparatus;
   receiving at least one further audio signal from a further apparatus;
   determining a relative orientation difference between the apparatus and the further apparatus;
   processing the at least one further audio signal from the further apparatus based on the relative orientation difference between the apparatus and the further apparatus; and
   combining the processed at least one further audio signal and the at least one audio signal so as to form a spatially synthesized audio signal based on the relative orientation difference and user-defined directional parameters from one of the apparatus and the further apparatus.

2. The method as claimed in claim 1, further comprising generating a visual representation of the further apparatus based on the relative orientation difference between the apparatus and the further apparatus; and displaying the visual representation of the further apparatus.

3. The method as claimed in claim 1, further comprising receiving an input associated with the visual representation defining an initial relative orientation difference between the apparatus and the further apparatus; and determining the relative orientation difference between the apparatus and the further apparatus based on the initial relative orientation difference.

4. The method as claimed in claim 1, further comprising at least one of: receiving at least one orientation indication with respect to the further apparatus, wherein an orientation determination comprises determining the relative orientation difference between the apparatus and the further apparatus based on the at least one orientation indication; and determining at least one orientation for the apparatus, wherein determining the at least one orientation comprises determining the relative orientation difference between the apparatus and the further apparatus.

5. The method as claimed in claim 1, wherein processing of the at least one further audio signal further comprises acoustically mapping the at least one further audio signal relative to the apparatus based on the relative orientation difference.

6. The method as claimed in claim 1, further comprising delaying the at least one audio signal such that an output based on the at least one audio signal is substantially synchronized with respect to the processed at least one further audio signal.

7. The method as claimed in claim 1, wherein combining the processed at least one further audio signal and the at least one audio signal comprises receiving a mixing input to alter a ratio of combining the at least one further audio signal and the at least one audio signal.

8. The method as claimed in claim 1, wherein determining the relative orientation difference between the apparatus and the further apparatus comprises tracking the relative orientation difference between the apparatus and the further apparatus.

9. The method as claimed in claim 1, further comprising at least one of: associating at least one microphone of the further apparatus with the apparatus so as to provide the at least one further audio signal to the apparatus, configured to record the at least one audio signal by at least one microphone of the apparatus; associating at least one receiver with the apparatus, configured to receive the at least one further audio signal; and associating at least one memory with the apparatus, configured to retrieve the at least one audio signal for combining with the at least one further audio signal.

10. The method as claimed in claim 1, wherein at least one of: receiving the at least one audio signal associated with the apparatus comprises capturing the at least one audio signal by at least one microphone of the apparatus; and wherein receiving the at least one further audio signal from the further apparatus comprises capturing the at least one further audio signal by at least one microphone of the further apparatus in the same acoustic space for transmitting the at least one further audio signal to the apparatus.

11. The method as claimed in claim 1, wherein the at least one further audio signal is classified as at least one audio object for mixing with the at least one audio signal.

12. The method as claimed in claim 6, further comprising displaying at least one audio object at a position relative to the at least one audio signal.

13. An apparatus comprising:
   at least one processor;
   at least one memory including computer program code, the at least one memory and the computer program code configured to, with the at least one processor, cause the apparatus at least to:
   receive at least one audio signal associated with the apparatus;
   determine a relative orientation difference between the apparatus and a further apparatus;
   process at least one further audio signal from the further apparatus based on the relative orientation difference between the apparatus and the further apparatus; and
   combine the processed at least one further audio signal and the at least one audio signal so as to form a spatially synthesized audio signal based on the relative orientation difference and user-defined directional parameters from one of the apparatus and the further apparatus.

14. The apparatus as claimed in claim 13, further configured to generate a visual representation of the further apparatus based on the relative orientation difference by a display configured to display the visual representation of the further apparatus.

15. The apparatus as claimed in claim 14, further configured to receive, on a user interface, an input associated with the visual representation defining an initial relative orientation difference between the apparatus and the further apparatus; wherein the orientation determiner is configured to determine the relative orientation difference between the apparatus and the further apparatus based on the initial relative orientation difference.

16. The apparatus as claimed in claim 13, further configured to receive at least one of at least one orientation indication with respect to the further apparatus, wherein the orientation determiner is configured to determine the relative orientation difference based on the at least one orientation indication; and an orientation determiner configured to determine at least one orientation for the apparatus, wherein the relative orientation determiner is configured to determine the relative orientation difference based on the at least one orientation.

17. The apparatus as claimed in claim 13, wherein the processor is configured to acoustically map the at least one further audio signal from the further apparatus to the apparatus based on the relative orientation difference.

18. The apparatus as claimed in claim 13, further configured to delay the at least one audio signal such that an output of the at least one audio signal is substantially delayed with respect to the at least one audio signal from the audio processor.

19. The apparatus as claimed in claim 13, further configured to receive a mixing input to alter a ratio of combining the processed at least one further audio signal and the at least one audio signal.

20. The apparatus as claimed in claim 13, wherein determining a relative orientation difference is configured to track the relative orientation difference between the apparatus and the further apparatus.

21. The method as claimed in claim 1, wherein the user-defined directional parameters from one of the apparatus and the further apparatus comprise a movable audio object on at least one of the apparatus and the further apparatus, wherein a user moving the movable audio object defines how the at least one audio signal or the at least one further audio signal is mixed with the spatially synthesized audio signal.

* * * * *